Figure 5:
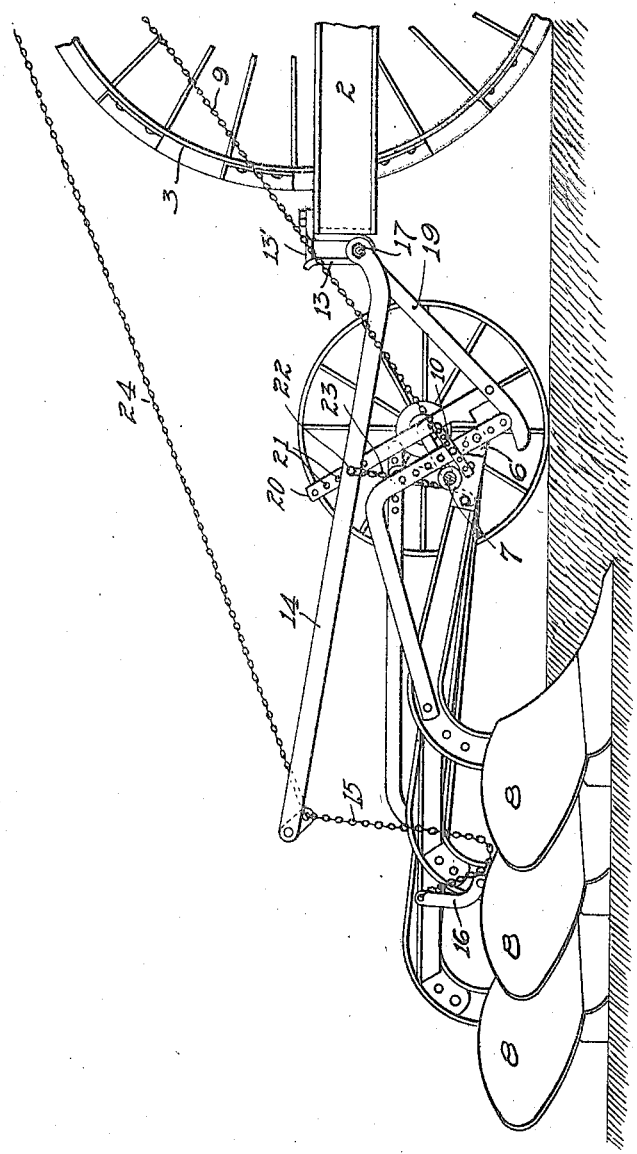

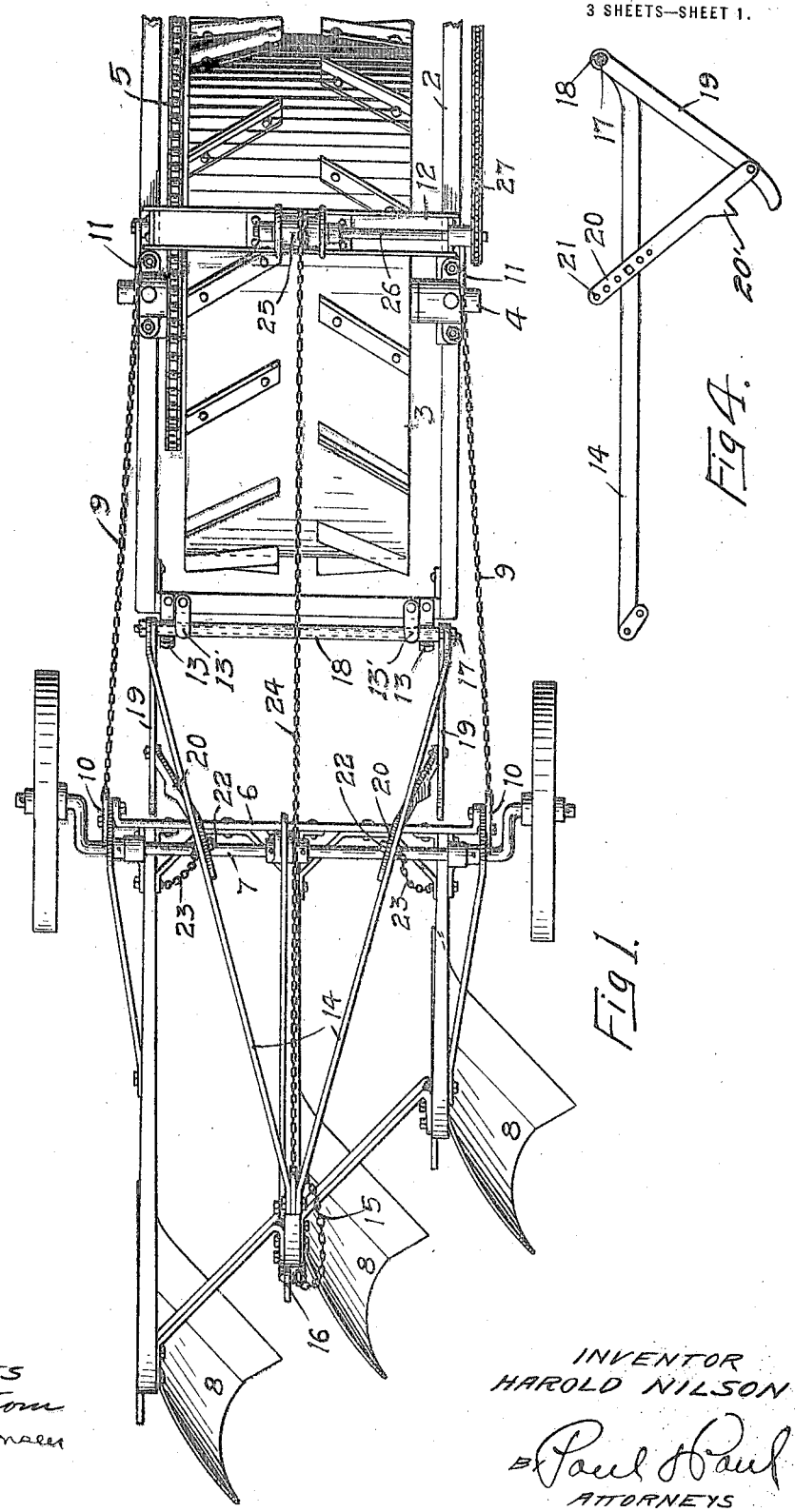

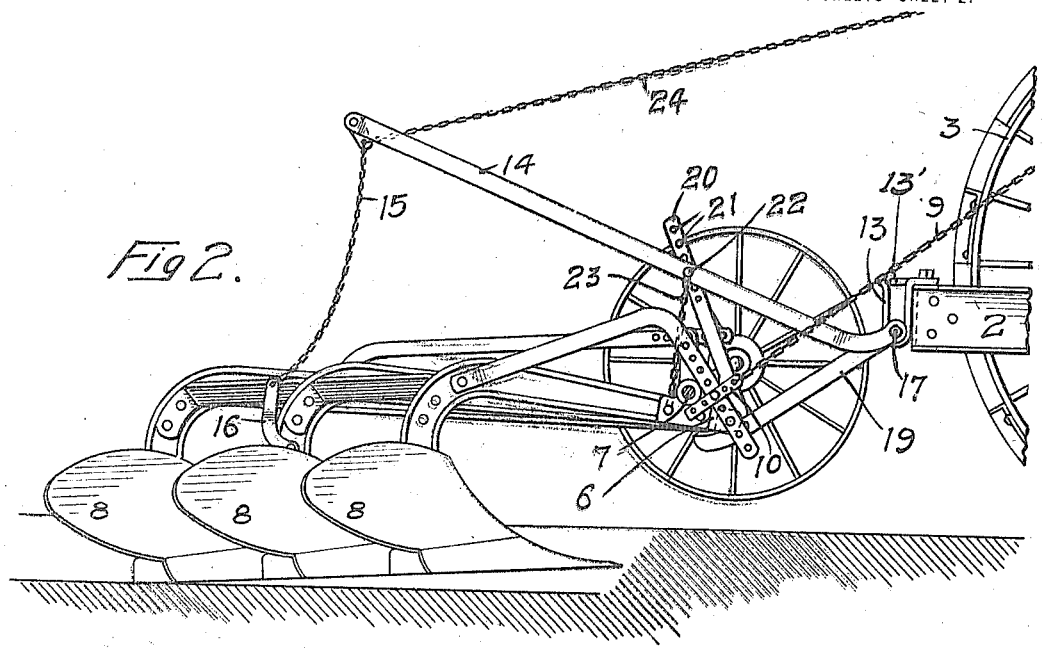
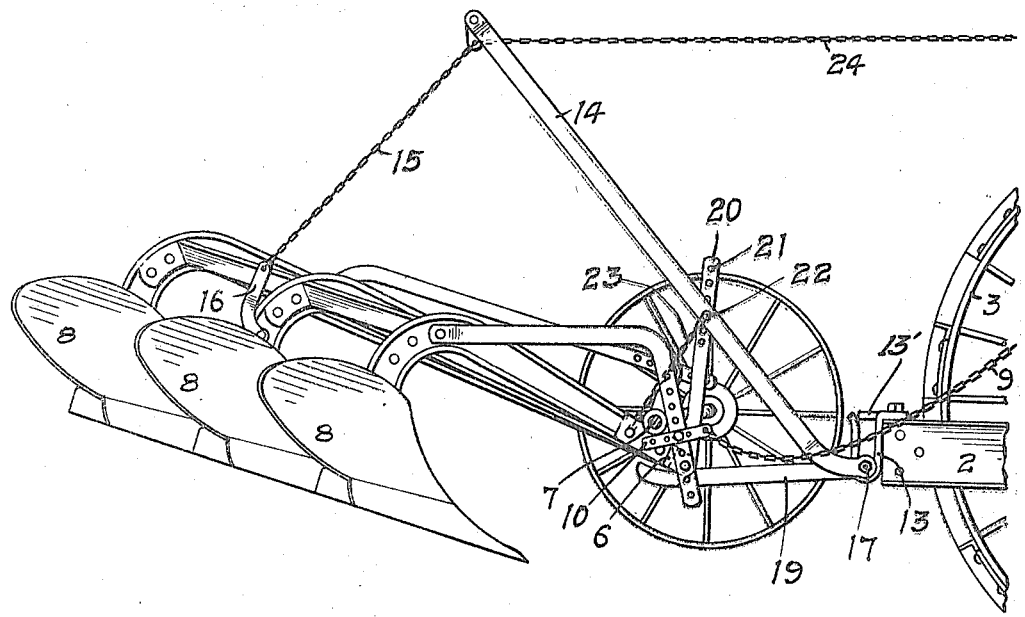

UNITED STATES PATENT OFFICE.

HAROLD NILSON, OF WAYZATA, MINNESOTA

PLOW-LIFT.

1,207,430.  Specification of Letters Patent.  Patented Dec. 5, 1916.

Application filed November 2, 1914. Serial No. 869,95'

*To all whom it may concern:*

Be it known that I, HAROLD NILSON, citizen of the United States, resident of Wayzata, county of Hennepin, State of Minnesota, have invented certain new and useful Improvements in Plow-Lifts, of which the following is a specification.

My invention relates to traction plows and particularly to the means for lifting the plows out of the furrows or off the surface of the ground.

A further object is to provide a lifting device adapted for use particularly with the draft connection shown and described in the application of Nils Nilson and Leonard Nilson, of even date herewith.

The invention consists generally in various constructions and combinations, all as hereinafter described and particularly pointed out in the claims.

In the accompanying drawings forming part of this specification, Figure 1 is a plan view of the rear portion of a traction machine, showing the plows attached thereto and the lifting means for raising the plows, Fig. 2 is a side elevation, partially in section, showing the plows partially raised out of the furrow, Fig. 3 is a similar view, illustrating the plows in their raised or elevated position, Fig. 4 is a detail view of the lifting device removed from the machine, Fig. 5 is a side elevation, showing the position of the plows at work.

In the drawing, 2 represents the frame of the tractor, provided with a rear traction wheel 3 mounted on an axle 4 and driven through a belt 5 from a suitable source of power, not shown. In the rear of the tractor is a plow frame 6 whereon an axle 7 having carrying wheels is mounted. The plows 8 have their beams secured to the frame, and draft connections, consisting preferably of chains 9, are connected at their rear ends to draft links 10 mounted on the plow frame, while the forward ends of the draft connections are attached to hooks 11 mounted on a suitable draft attaching means, such as a yoke 12 that is secured to the frame 2 and straddles the traction wheel. The hooks are so positioned on the yoke that the draft connections will exert a downward pull on the traction wheel and increase the traction thereof. This feature of the machine I make no claim to in this application, as it forms the subject matter of the Nils Nilson and Leonard Nilson application, above referred to.

At the rear end of the traction frame I provide hooks 13 wherein the plow lifting device, which forms the subject matter of this application, is mounted. This lifting device consists preferably of a V-shaped frame 14 extending backwardly over the plow beams and having a flexible connection 15 between its apex and the clevis 16 that is mounted on the rear portion of the middle beam. The forward diverging ends of the V-shaped frame are connected to one another by a bolt 17 having a sleeve 18 thereon that is adapted to fit loosely in the hooks 13. I prefer to pivot latches 13' on the machine frame in position to swing outwardly and close the openings at the top of the hooks 13, and thereby prevent the sleeve 18 from accidentally becoming separated from the hooks during the operation of the machine, or when the plows are being raised or lowered.

Bars 19 are mounted on the bolt 17 between the forward ends of the V-shaped frame and the sleeve and depend downwardly and rearwardly in position to engage the plow frame when the V-shaped frame is lifted, and similar bars 20 are pivoted on the bars 19 and have adjustable connections by means of holes 21 and bolts 22 with the frame 14. By raising or lowering the bars 20, the position of the bars 19 with respect to the plow frame may be varied to regulate the time of engagement of the said bars 19 with the plow frame and the lifting of the plows. I prefer to provide lugs 20' projecting rearwardly from the bars 20 and in the path of the cross bar at the forward end of the plow frame to keep the plow beams from jumping upwardly out of their normal working position. Lifting means, such as chains 23, connect the bolts 22 with the forward ends of the outer plow beams and the rear portion of the frame 13 is connected by flexible means, such as a chain 24, with a drum 25 that is mounted preferably on the yoke 12 and has a shaft 26 that is driven through a belt 27 from a suitable mechanism for operating the winding drum by hand or power, as preferred.

The connection of the lifting frame with the hooks 13 is loose and has no draft function whatever, merely serving as a pivot or hinge, and upon the initial movement of the lifting device or when the connection 24 is first put under tension, the bars 19 engaging the forward portion of the frame will tilt the plow points upwardly, so that the plows will run out of the ground as the machine moves along. Then, as the lifting operation continues, the connection 15 will be put under tension to raise the plows bodily to the desired elevation. The period of engagement of the bars 9 with the frame may be regulated by the adjustment of the bars 20.

In the operation of the machine, the lifting chains will normally be slack and the lifting device inactive, the draft connections forming the only draft means between the plows and the traction machine. When, however, it is desired to raise the plows out of the ground, the lifting drum will be operated to tension the connection 24 and the initial movement of the lifting device will tilt the forward portions of the plows and frame, as indicated in Fig. 2, raising the plow points, and further movement of the lifting device will take up the slack of the connection 15 and cause the rear portions of the plows to be raised. As soon as the plows are raised, the draft connections 9 will become slack and inactive. Upon unwinding the lifting drum, the plows will drop back upon the ground and when the lifting device has been lowered sufficiently, it will drop out of engagement with the plow frame, the draft connections will again become taut, and the plowing operation may be resumed. As before stated, the period of engagement of the lifting device with the plow frame may be varied by the adjustable connections between the bars 20 and the frame 14 of the lift.

In various ways the details of construction herein shown and described may be modified and still be within the scope of my invention.

I claim as my invention:

1. The combination, with a traction machine having a rear traction wheel, of a plow frame and a series of plows, a lifting and tilting device interposed between said plow frame and said traction machine and having a non-draft bearing on the latter and when raised, engaging the forward portion of said plow frame to lift the same, and draft connections extending from said plow frame to said traction machine.

2. The combination, with a traction machine frame and a rear traction wheel, of a plow frame and a series of plows, draft connections between said plow frame and said traction wheel frame, a lifting device loosely supported on the rear end of said traction wheel frame and having downwardly and backwardly extending arms to engage and tilt said plow frame when said lifting device is raised, and flexible means connecting said lifting device with said traction wheel frame.

3. The combination, with a traction machine frame and a rear traction wheel mounted therein, of a plow frame and plows, and draft means connecting said plow frame with said traction machine frame, a lifting and tilting device comprising a V-shaped frame, pivotally supported on the rear of said traction machine frame, and having arms depending downwardly and rearwardly from said V-shaped frame in position to engage and tilt said plow frame when said V-shaped frame is lifted, flexible means connecting said V-shaped frame with said plows, and flexible lifting means connecting said V-shaped frame with said traction machine frame.

4. The combination, with a traction machine frame and a rear traction wheel, of a plow frame and plows connected therewith, draft connections between said plow frame and said traction machine frame, a lifting and tilting device pivotally supported on the rear of said traction machine frame and comprising a rearwardly projecting frame having a flexible connection with the plow beams, bars projecting rearwardly and downwardly from the forward portion of said rearwardly projecting frame in position to engage said plow frame when said lifting device is raised, means for adjusting said bars to vary their time of engagement with said plow frame, and flexible lifting means connecting said machine frame with said rearwardly projecting frame.

5. The combination, with a traction machine frame and a rear traction wheel, of a plow frame and a series of plows, draft connections between said plow frame and said traction wheel frame, a tilting device supported on the rear portion of said traction wheel frame and having means extending downwardly and rearwardly beneath the forward portion of said plow frame, elevating means connecting said tilting device with said traction machine frame, and means for varying the time of engagement of said tilting device with said plow frame.

6. The combination, with a traction machine frame, of a ground-working implement frame and ground-working implements mounted therein, a lifting device having a pivotal non-draft connection with said machine frame and provided with means for tilting the forward portion of said implement frame upwardly during initial lifting movement and raising said frame bodily during its subsequent movement.

7. In combination with a traction machine frame, ground-working implements and a frame therefor, a lifting device provided with a non-draft bearing on the rear portion of said machine frame and having means for raising said implement frame bodily when said lifting device is swung upwardly on its pivot.

In witness whereof I have hereunto set my hand this 20th day of October, 1914.

HAROLD NILSON.

Witnesses:
EDWARD A. PAUL,
GENEVIEVE E. SORENSEN.